Oct. 30, 1962  J. U. DALY  3,060,756
CONTROL VALVE

Filed Oct. 6, 1960 2 Sheets-Sheet 1

INVENTOR
JAMES URBAN DALY

BY Roy E Raney
ATTORNEY

Oct. 30, 1962  J. U. DALY  3,060,756
CONTROL VALVE
Filed Oct. 6, 1960  2 Sheets-Sheet 2

INVENTOR
JAMES URBAN DALY

BY Roy E Raney
ATTORNEY

3,060,756
CONTROL VALVE
James Urban Daly, Columbus, Ohio, assignor to Ranco Incorporated, Columbus, Ohio, a corporation of Ohio
Filed Oct. 6, 1960, Ser. No. 60,922
3 Claims. (Cl. 74—53)

The present invention relates to an improved control valve mechanism suitable for conveniently and accurately controlling the flow of heating liquid through an automobile heater or the like.

More particularly, this invention relates to an improvement in the type of valve which comprises a housing having a flow port therein which is arranged to be gradually closed or opened by a valve member supported on a valve stem, the stem being moved axially to position the valve closing member relative to the port. The valve stem is actuated by a mechanism, preferably a manually operated cam, and it is a primary object of this invention to provide connection means between the cam and valve stem for maintaining substantially zero play in the axial direction but which permits considerable lateral shifting of the stem to allow alignment of the valve member with the valve port to insure accurate closing or seating by the valve member while providing precise positioning of the valve member in various spacing relations to its seat to thereby accurately control the flow of liquid therethrough.

It is a more specific object of the invention to provide a valve of the above mentioned character wherein the valve member has laterally acting guide means and the valve stem is provided with an enlarged end portion, preferably a ball formation, which is gripped between two levers which are pivoted together between their respective ends in the manner of scissors, the first lever being also pivoted at one end to a suitable body or frame of the control valve so that movement of the levers in one direction about the pivot in the frame tends to axially move the stem gripped thereby to close the valve member and movement of the levers in the other direction moves the stem and valve members to the various open positions for controlling the liquid flow, the second lever having one end portion engaging a manually operated cam and having the other end portion engaged by a compression spring which urges the first and second levers to grip the enlarged end of the stem and biases the levers toward the cam so that the two levers and the valve stem are maintained by the spring in positions precisely governed by the cam, the gripping levers preventing play of the valve stem in a longitudinal direction but permitting movement of the stem laterally under the influence of the guide means to insure proper seating of the valve member on its seat.

As another object of the invention, the arrangement provides means whereby the stem actuating mechanism is self-adjusting to take up wear and occupies a minimum of depth so that the entire mechanism is relatively compact and can be formed principally of metal stampings.

Other objects and advantages of the invention will be apparent from the following description of a preferred form thereof, reference being made to the accompanying drawings wherein FIG. 1 is a perspective view of the liquid control valve embodying the invention;

Figure 1:
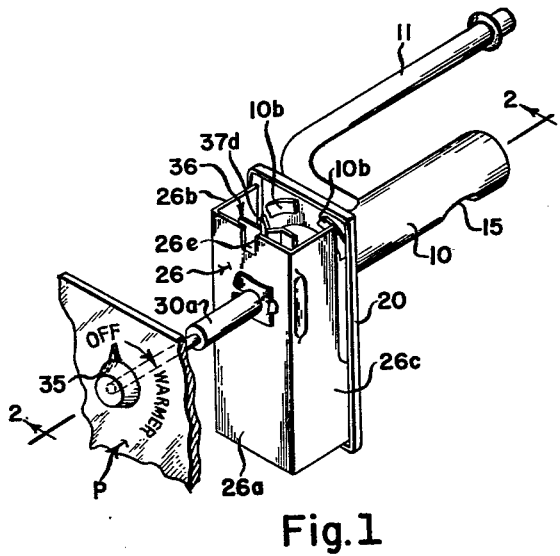
Figure 3:
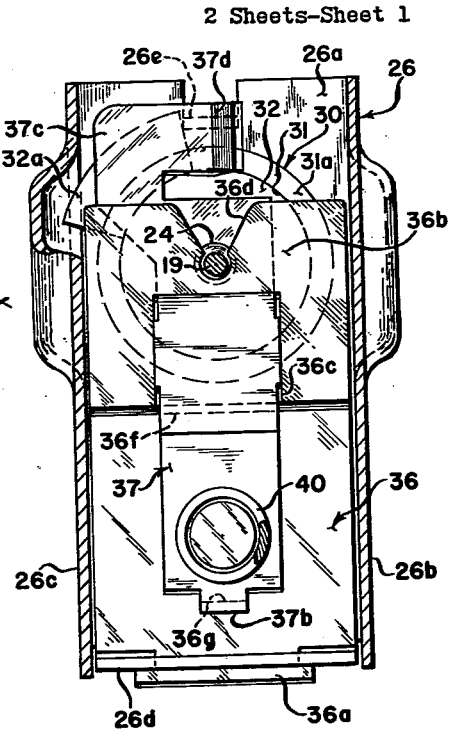
FIG. 3 is a sectional view taken along line 3—3 of FIG. 2.

In the form of the valve shown the valve is particularly suitable for controlling the flow of heating liquid from the cooling jacket of an automobile engine through a heater core, not shown, disposed in the passenger's compartment of the automobile, and the rate of flow being controlled by a manual setting of the valve. In the form shown the valve comprises a tubular body member 10 having an L-shaped pipe 11 connected thereto to form an inlet opening 12. An annular valve plate 13 is brazed inside the tube 10 and is extruded to form a seat around a valve port 14. The right hand end of tube 10 is open and it includes an opening 15 through which water or liquid may flow to the automobile heater core, it being understood that a portion of tube 10 is inserted in the header of the core. Pipe 11 is suitably connected with the cooling jacket of the automobile engine to receive heated liquid therefrom.

Valve port 14 is adapted to be closed by a valve member 16 which is in the form of a molded disc having guide means in the form of ribs 16a and which is suitably attached to a stem 19 which is arranged to be moved axially by means described hereinafter to regulate the opening through valve port 14. The left hand end of tube 10 has a flared collar 10a brazed thereto which includes ears 10b which project through a frame plate 20 and are turned over to secure the end of tube 10 to plate 20. A rubber diaphragm 21 is interposed between the end edges of tube 10 and plate 20 to provide a watertight seal, and diaphragm 21 includes a nut portion 21a through which stem 19 projects and which is hermetically joined with the stem by crimping wires 21b which force the rubber of the nut portion into an annular groove formed about the stem, as shown. Preferably, a metal cap 22 is disposed over the end of nut portion 21a and is secured in place by a snap ring 23 located in a groove formed about the stem. The outer end of the stem is reduced in diameter and has a ball formation 24 formed thereon.

Plate 20 forms a part of a housing which includes a U-shaped stamping 26 which forms a yoke wall 26a from which two side walls 26b and 26c project. The housing 26 also includes an inturned end wall portion 26d and at the upper end includes an inturned lug 26e.

A manually rotatable cam means 30 is rotatably supported on wall 26a and the cam means includes a shaft 30a which projects through an opening in the yoke wall and carries a cup-shaped cam 31 which is attached to the shaft by a non-circular opening to provide positive rotation of the cam 31 with the shaft. A stop plate 32 is similarly attached to the shaft 30a and it includes a fan-shaped projection 32a the edges of which are arranged to engage opposite edges of lug 26e to limit rotation of the cam 31. Shaft 30a has a suitable knob 35 attached to the outer end thereof which may be positioned on the face of an instrument panel indicated generally at P and having a pointer which indicates the "off" position and the warmer adjustment to be made by the operator of the valve. Cam 31 has a spiral shaped cam surface 31a, the purpose of which will appear hereinafter.

The present invention relates to an improved connection between the manual adjusting mechanism and a valve stem and it comprises a plate like lever 36 which has a T-shaped lug formation 36a at one end which is received in a T-shaped opening in end wall 26d which forms a pivot for lever 36. The lever has an offset portion 36b which has a V-slot 36d and a circular opening at the apex thereof which receives the reduced end of stem 19 adjacent to ball portion 24.

A second lever 37, having a U-shaped portion 37a, is pivoted to lever 36 by extending through an opening 36c therein with the U-shaped portion 37a pivoting against the web portion 36f of the lever 36. The levers 36, 37 are thereby crossed and pivoted between their respective ends in the manner of scissors. Lever 37 is maintained in alignment with the lever 36 by a turned lug 37b at one end of lever 37 and projecting through an opening 36g formed in lever 36. The other end of lever 37 includes a portion 37c which engages the left hand end of ball 24 and which includes a ridge or cam follower 37d which rides on the cam surface 31a.

Figure 2:
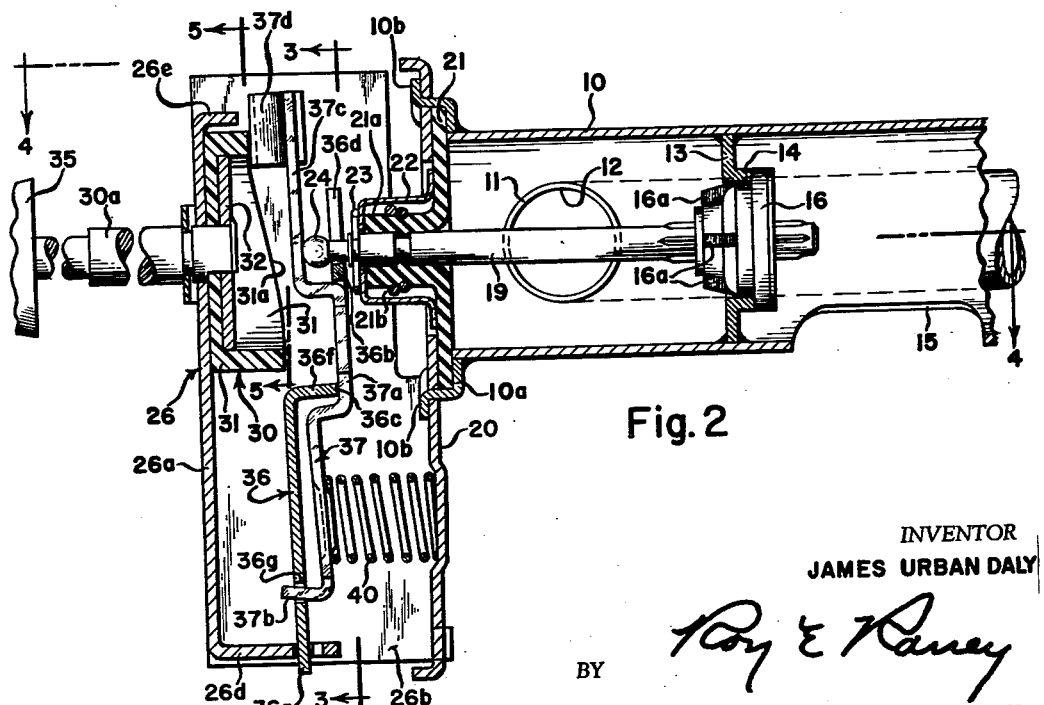
FIG. 2 is a sectional view of the control valve shown in FIG. 1, the valve being shown on a larger scale.
Figure 4:
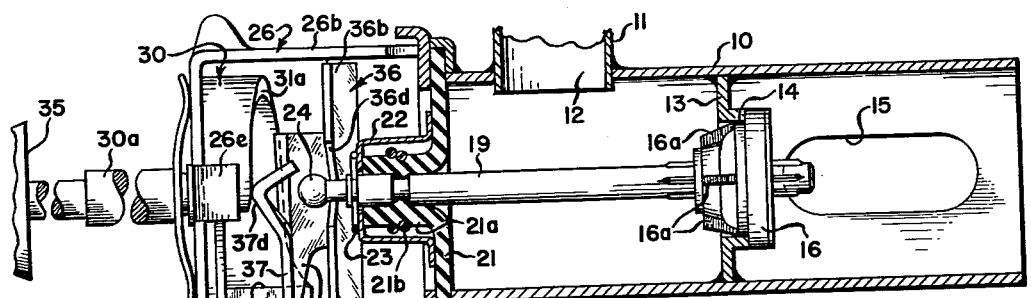
FIG. 4 is a sectional view taken along line 4—4 of FIG. 2.
Figure 5:
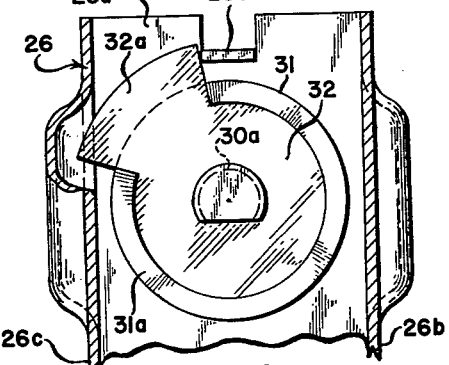
FIG. 5 is a fragmentary sectional view taken substantially along line 5—5 of FIG. 2.
Figure 7:
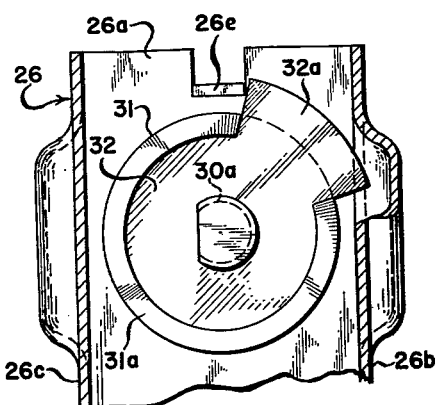
FIG. 7 is a sectional view taken along line 7—7 of FIG. 6.
Figure 6:
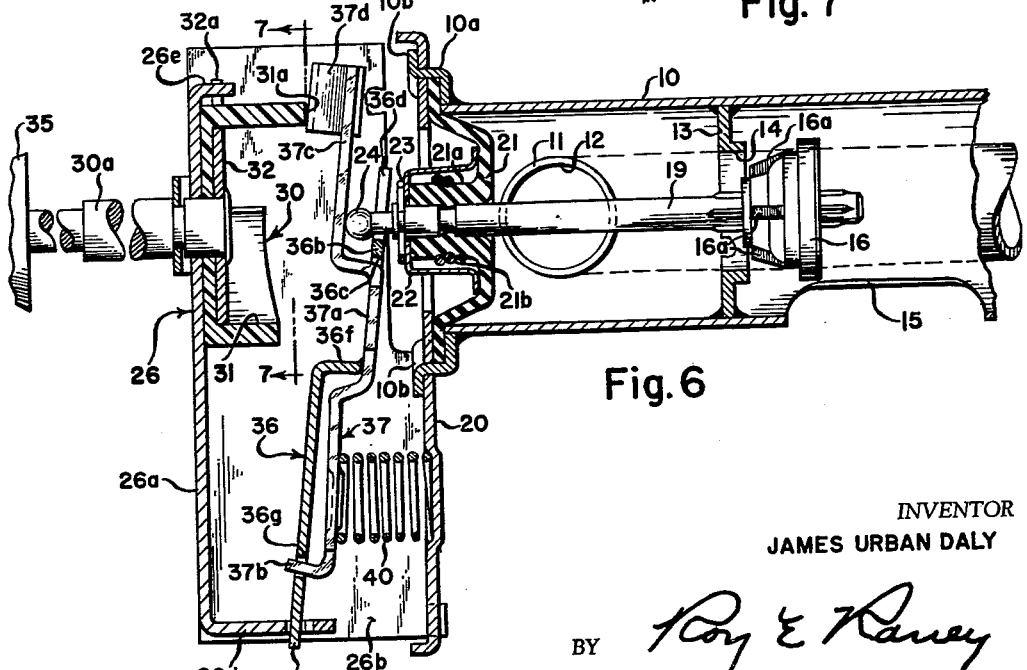
FIG. 6 is a sectional view of the valve similar to that shown in FIG. 2 but showing the parts in a different position.

Levers 36 and 37 are urged in unison about the pivot formed by lug 36a and wall 26d in a counter-clockwise direction, as viewed in FIG. 2, by a compression spring 40 which is disposed against plate 20 and against lever 37 between the just mentioned pivot and the pivotal connection of levers 36 and 37 about web 36f. The force of spring 40 urges the ridge or cam follower 37d against the cam surface 31a and at the same time causes levers 36 and 37 to close firmly on the ball 24 in the manner of a scissors about the pivot formed by web 36f. It will be recognized that once the levers have closed on ball 24 they will be urged as a unitary lever means about the pivot at connection of lug 36a and wall 26d in a counter-clockwise direction under the action of the spring 40 and so the cam follower 37d will be maintained in contact with the cam surface 31a.

It will also be recognized that the ball 24 will be constrained by the above-described scissors action to move with the levers and that both the position of the levers 36, 37, which are positioned by cam surface 31a, and the axial position of the valve stem 19 will be accurately maintained according to the adjustment of the cam. Thus, when the lowest point of the cam surface 31a is presented to the follower 37d, the spring 40 will move the levers 36, 37 in a counter-clockwise direction thereby moving the ball 24 and stem 19 to the left and moving the valve member 16 to its closed position against its seat 14 without any play axially of the stem 19 being experienced between the ball 24 and the levers. Likewise, when the cam surface 31a is turned to present some higher point to the follower 37d, the levers 36, 37 will be moved against the action of the spring and will move the ball 24 and stem 19 in a direction to move the valve member 16 to an open position with no axial play being experienced between the ball and the levers 36, 37.

Although the ball is firmly clamped between the levers 36, 37, preventing axial play therebetween, the pressure of the spring 40 is not so great as to prevent rotation of the ball, thereby permitting limited lateral displacement of the end of the stem 19 carrying the valve member 16. It will be seen that by the above described arrangement the valve member 16 can be finely and accurately positioned axially of the stem 19 by rotation of the cam 31 and yet is free to be guided laterally with respect to the seat 14 by the guide ribs 16a.

From the foregoing description of a preferred form of valve embodying the invention, and from the accompanying drawings, it will be apparent that there has been provided a control valve mechanism comprising an axially movable valve stem which may be accurately positioned while at the same time permitting lateral movement of the stem with respect to the actuating mechanism. It will also be apparent that the invention accomplishes these ends through a novel arrangement of parts which is otherwise advantageous in that it is simple to manufacture, compact in size, and is self-adjusting to take up wear.

Although the invention has been described by reference to a specific form of control valve mechanism embodying the invention, it is understood that the invention is not limited thereto, but rather the invention includes all those changes, adaptations and modifications reasonably embraced by the scope of the claims hereof.

Having described my invention, I claim:

1. An actuating device of the character described comprising a frame, a manually operable cam mounted on said frame, first and second levers pivoted together between their respective ends, said first lever being pivoted at one end to said frame, said second lever having one end engaging said cam, and spring means acting between said frame and the other end of said second lever, whereby said spring biases said second lever into engagement with said cam and urges said levers to pivot with respect to one another to effect a gripping action between adjacent ends thereof for gripping a member of a device to be actuated, and said cam being operable upon rotation to position said levers and said member when gripped thereby.

2. An actuating device as defined in claim 1 wherein one of said adjacent ends of said levers is characterized by a slot therein for receiving a portion of said member when gripped by said ends.

3. An actuating device as defined in claim 2 wherein said slot is defined in said first lever.

References Cited in the file of this patent
UNITED STATES PATENTS

| | | |
|---|---|---|
| 477,463 | Schier | June 21, 1892 |
| 2,804,087 | Olson | Aug. 27, 1957 |

FOREIGN PATENTS

| | | |
|---|---|---|
| 116,148 | Switzerland | 1926 |